United States Patent [19]

Chevroulet et al.

[11] Patent Number: 4,685,875
[45] Date of Patent: Aug. 11, 1987

[54] PRESSURE RELIEF DEVICE FOR EXTRUSION APPARATUS

[75] Inventors: Léon Chevroulet; Guy Salmon, both of Pratteln, Switzerland

[73] Assignee: Buss AG, Basel, Switzerland

[21] Appl. No.: 768,869

[22] Filed: Aug. 23, 1985

[30] Foreign Application Priority Data

Aug. 25, 1984 [DE] Fed. Rep. of Germany ....... 3431274

[51] Int. Cl.⁴ .................... B29C 47/96; B29C 47/16
[52] U.S. Cl. .................................. 425/136; 425/154; 425/381; 425/376 R; 425/382 R; 425/466
[58] Field of Search ................. 425/381, 133.1, 133.5, 425/136, 140, 146, 149, 376 R, 378 R, 466, 153, 154, 169, 380, 382 R, 382 N

[56] References Cited

U.S. PATENT DOCUMENTS

| | | | |
|---|---|---|---|
| 3,154,808 | 11/1964 | Ahlefeld et al. | 366/76 |
| 3,499,952 | 3/1970 | Kolner et al. | 425/149 |
| 3,526,926 | 9/1970 | Reid | 425/149 |
| 3,535,738 | 10/1970 | Vossen | 425/376 R |
| 3,628,561 | 12/1971 | Corbett | 425/149 |
| 3,830,610 | 8/1974 | Ohkawa et al. | 425/466 |
| 3,947,201 | 3/1976 | Ellwood | 425/376 R |
| 4,439,125 | 3/1984 | Dieckmann et al. | 425/381 |

Primary Examiner—Jay H. Woo
Assistant Examiner—James C. Housel
Attorney, Agent, or Firm—Karl F. Ross; Herbert Dubno

[57] ABSTRACT

A discharge nozzle connected to the outlet of an extruder is built wedge-shaped in vertical longitudinal section and comprises a lower housing part and an upper housing part. The upper housing part is adapted to be swung open by being pivoted around a pivot axis, thus causing the nozzle to open. This opening of the nozzle occurs under the influence of a control and actuating member, as soon as a predetermined value of twisting moment, pressure or temperature is exceeded. The nozzle discharge opening has shutting locking bolts associated with it, adapted to shut off the discharge channels of the discharge opening of the nozzle. The discharge nozzle may be used to advantage for the continuous processing of electrode material.

3 Claims, 1 Drawing Figure

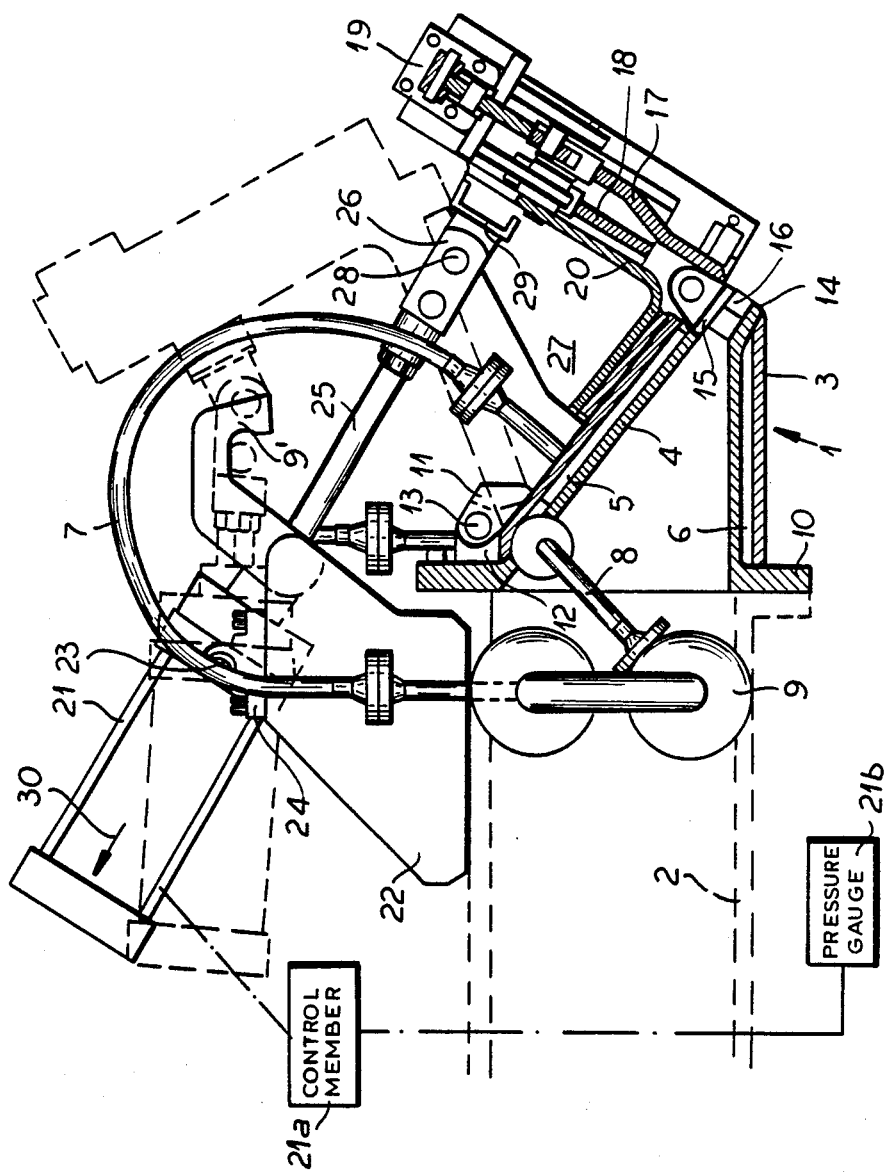

4,685,875

PRESSURE RELIEF DEVICE FOR EXTRUSION APPARATUS

FIELD OF THE INVENTION

The present invention relates to a continuously operating extrusion apparatus and, more particularly, to a mixing or kneading device with a discharge nozzle at the extrusion end of the device.

BACKGROUND OF THE INVENTION

In continuously operating mixing and kneading systems or extruders, the operational conditions must be held constant and the product maintained uniform. Any changes in the conditions concerning the supply or the composition of the material, or in the conditions regarding the pressure and the temperature, are effective to exert an influence on the properties of the kneaded product. The pressure conditions in the housing are determined by the cross-section at the discharge end of the nozzle. Changing the pressure conditions is known to have been accomplished by the use of nozzles provided with movable flaps, usually set manually by the operating personnel. By changing the cross-section at the discharge end of the nozzle, it is possible to influence the shaping of the material being processed. The known discharge nozzles adjustable by means of a motor have the disadvantage that they cannot be controlled fully automatically over the entire range of operating conditions prevailing in the discharge nozzle, or the extruder, or the mixing and kneading system, as the case may be. Furthermore, they vary during operation in regard to their cleaning and service requirements and therefore need accurate monitoring.

OBJECT OF THE INVENTION

A basic object of the present invention is to provide a continuously operating extrusion apparatus with a discharge nozzle which helps to relieve the material being processed in easy and simple fashion as soon as a predetermined limit value in the nozzle housing is exceeded, for example, when predetermined pressure or temperature values are exceeded. Such an apparatus helps increase its production output, with the result of grater economy and the possibility to automatically and continuously monitor the discharged product.

SUMMARY OF THE INVENTION

This object is achieved, in accordance with the invention, in an apparatus which comprises an extrusion cylinder or barrel with a feed screw or worm rotatably arranged in the cylinder or barrel, a discharge nozzle arranged at the extrusion end of the cylinder or barrel and comprising a housing, the housing being divided into an upper housing part and a lower housing part, the upper housing part being swingably mounted by a transverse axis on the lower part of the housing in order to open and close the housing of the discharge nozzle, an actuating member arranged on said cylinder or barrel member having means to open and close the housing the nozzle, and control means arranged in the housing and operatively connected to the actuating means in order to open the nozzle means in dependence of limited conditions in the housing.

The nozzle of the invention may be arranged on the output end of a mixing and kneading system by way of a vertical chute. In this case the extruder is preferably provided with at least two extruder shafts arranged parallel to each other, so that a larger number of parallel extrusion trains my be simultaneously produced. An assembly of this kind consisting of a continuously operating mixing and kneading system, a gravity chute, and an extruder provided with a discharge nozzle, is particularly suited for the continuous processing of electrode material. In an assembly of this kind, the quantity of material mixed and kneaded in the mixing and kneading system is further processed within the extruder; it is specifically extruded in the form of trains and finally formed into briquettes. The briquetted mass then arrives directly into the continuous anodes of the Söoderberg electrolysis furnace.

It should be emphasized, however, that the suggested discharge nozzle may be used in conjunction with other types of mixing and kneading systems, or extruders, suited for processing quantities of material sensitive to temperature or pressure. In such cases the nozzle reliably helps prevent any excessive increase in pressure or temperature.

Additional features of the invention become evident from the dependent claims, the descriptive part of the specification, and the drawing. Special attention is called to the fact, that all of the features described in the descriptive part of the specification and illustrated in the drawing are to be considered as constituting the invention, both individually and in combination.

BRIEF DESCRIPTION OF THE DRAWING

An embodiment of the proposed nozzle is shown in the sole FIGURE of the accompanying drawing in vertical section.

SPECIFIC DESCRIPTION

The discharge nozzle identified as a whole by the reference numeral 1 is connected to the extrusion end of the cylinder 2 of a mixing and kneading apparatus, both indicated schematically by dashed lines. The extruder may have for example four extruder shafts or feed screws arranged parallel to each other in the horizontal central plane of the extruder housing. This arrangement is well known and not illustrated. This discharge nozzle is secured by flanges to the housing of the extruder 2 and has a wedge-shaped form in vertical longitudinal section. The nozzle comprises a lower housing part 3 and an upper housing part 4, the latter being inclined with respect to the horizontal lower housing part 3. The two parts include an angle of about 45°, as shown in the drawing. This angle could vary, however, between 30° and 75°. Both the lower housing part 3 and the upper housing part 4 are of double-wall construction, with communicating cavities or channels 5 and 6 provided between the inner and the outer walls, and adapted to receive a heating or a cooling medium. The heating or cooling medium is supplied through a conduit 7 and returned through a conduit 8, said conduits being supplied by a pump 9 in the usual manner. It is often useful to have various sections of the discharge nozzle 1 held at different temperatures. To this end, said cavities may be subdivided into separate sections, each section having its own circulation system and having heating or cooling media circulating at different temperatures within circuits independently of one another.

The lower housing part 3 is directly connected to the flange 10, i.e., is built integral with the flange, whereas the upper housing part 4 is pivotably supported, on a laterally protruding arm 12 of the flange 10, by means of a bracket 11. A horizontal pivot axis 13 extends through appropriate bores of the bracket 11 and the arm 12. In the normal discharge position of the nozzle 1 as illustrated there are upper and lower nozzle lips 14 and 15 providing to bound an elongated slotlike discharge opening 16. The discharge opening 16 comprises a number of active shaping members cast directly, or bolted onto the upper housing part 4 or the lower housing part 3. These shaping members, which in themselves are known in the art and are not shown in detail in the drawing, are adapted to act as shaping channels, rectangular, round, or oval in shape, depending on the desired cross-section of the extruded strand. The present arrangement is such, that either some or all of the channels may be closed together. For this purpose, a slider 17 and a slider 18 are slidably arranged and can be activated either individually or together. The slider 17 is provided with a locking cam, adapted to close a number of the extruder openings. The slider 18 is also provided with a locking cam, adapted to close those openings not affected by the slider 17. The sliders 17 and 18 are activated pneumatically by means of a control device 19, both the sliders 17, 18 and the control device being supported on a support bracket 20.

In order to open the nozzle the upper housing part 4 is pivoted about the pivot axis 13 together with the support bracket 20, the control device 19 and the slider 17, from the solid line position in the counter-clockwise direction to the broken-line position.

The aforementioned rotation is accomplished by means of a pressurized air cylinder 21 fixedly mounted in a yoke 22 rotatable around an axis 23. The yoke 22 is mounted on the mixing and kneading system 2 and is adapted to support the bearing 24 with its pivot axis 23, around which said air cylinder 21 is pivotably mounted. The air cylinder 21 comprises a piston not shown in the drawing. The piston rod of this piston has at its end distal from the cylinder, a fork-shaped mounting bracket 26 rotatably mounted between two walls 27 bounding the support bracket 20. The pivot joint consists of a horizontal shaft 28 supported in a bearing 29 between the two walls 27 of which only one is visible in the drawing.

Activating the air cylinder 21 causes its piston to be withdrawn in the direction of the arrow 30, and its piston rod 25 to simultaneously perform the same movement. This in turn causes the upper housing part 4 to be pivoted around the pivot axis 13 in counterclockwise direction; at the same time, the air cylinder 21 and the sliders 17 and 18, together with the control device 19 and the guideways, will assume their end positions indicated with dashed lines in the drawing and will snap into a mechanical detent 9'. In this position the discharge nozzle will be open.

The air cylinder 21 is actuated by way of a control member (21a), connected for example to sensing means in the form of a pressure gage 21b provided within the mixing and kneading system or the nozzle. Exceeding a predetermined maximum pressure will make the control member actuate the air cylinder, with the effect, that the upper housing part 4 will become swung open. It is also possible to measure the temperature, specifically the temperature as the measured parameter of the processed material in the mixing and kneading system, the extruder, or the discharge nozzle 1, and to activate the air cylinder 21 to cause the discharge nozzle 1 to be swung open via the control member. A further possibility consists in measuring the twisting moment at the extruder shafts and causing the discharge nozzle to be swung open, as soon as the maximum allowable twisting moment has been exceeded. At the same time an alarm device may be activated, to indicate, that the nozzle is open.

In the described apparatus the shaping operation take place separate from the mixing and kneading part of the extruder in the nozzle. In this manner, a larger number of smaller extruder strands may be produced. The form of such strands may be optional.

Opening the discharge nozzle 1 will cause an immediate pressure drop in the extruder housing connected to the inlet end of the nozzle, and in the mixing and kneading system. At the same time, the same control device may be used to control the drive motor of the extruder or of the mixing and kneading system.

Further the nozzle may be operated at temperatures dictated by the desired properties of the material to be processed, in a way to effectively prevent the material from becoming prematurely cooled down or solidified.

A pneumatic control device 19 comprising two cylinders will enable to actuate the two sliders 17 and 18 together or separately, and will make a fully automatic operation by remote control possible.

What we claim is:

1. A continuously operable extrusion apparatus, comprising:
    an extruder having a substantially horizontal worm-extrusion cylinder having a discharge end; and
    a discharge nozzle mounted at said end, said discharge nozzle including:
    a housing formed with a lower housing part and an upper housing part inclined toward said lower housing part in an extrusion direction to include an acute angle with said lower housing part and define therewith an elongated continuously open extrusion-defining outlet slot transverse to an axis of said cylinder,
    pivot means for mounting said upper housing part to swing about a pivot axis transverse to said axis of said cylinder exclusively between a singular closed operating position in which said continuously open slot is formed and in part defined by said upper housing part and a singular open relief position in which the interior of said housing is relieved of pressure and said upper housing part is inclined away from said lower housing part in said direction,
    a fluid-pressure-operated actuating cylinder pivotally mounted on said extruder and having a piston rod pivotally connected to said upper housing part for swinging said upper housing part between waid positions,
    sensing means in one of said extruder and said housing for detecting at least one extrusion parameter from the extrusion pressure and the extrusion temperature,
    a control member connected to said sensing means and to said actuating cylinder for operating said actuating cylinder to swing said upper housing part into said relief position from said operating position only upon the detected parameter exceeding a predetermined limit, and
    respective sliders mounted on said upper housing part and variably displaceable to define respective channels along said slot, and control means independently of said actuating cylinder operatively connected to said sliders for selectively displacing the sliders.

2. The extrusion apparatus defined in claim 1 wherein each of said housing parts is of double-wall construction and defines a cooling chamber, further comprising means for passing a cooling fluid through said chamber.

3. The extrusion apparatus defined in claim 1 wherein said actuating cylinder is obviously mounted in a yoke on said extruder, said yoke being provided with a detent engageable with said upper housing part for retaining same in said relief position.

* * * * *